Sept. 28, 1937.  H. G. MUELLER  2,094,159
VALVE MECHANISM FOR STEAM ENGINES
Filed Aug. 31, 1936  4 Sheets-Sheet 3

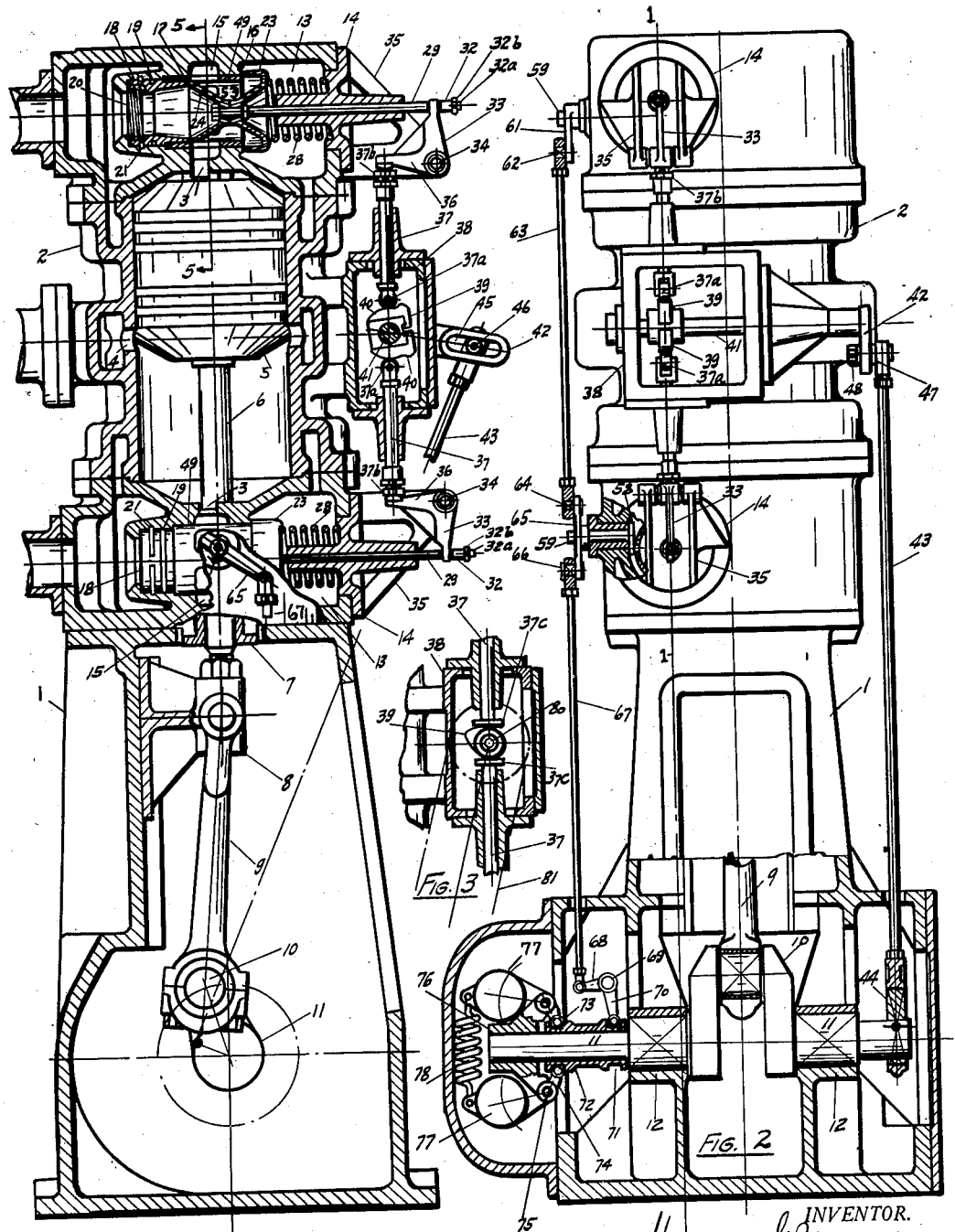

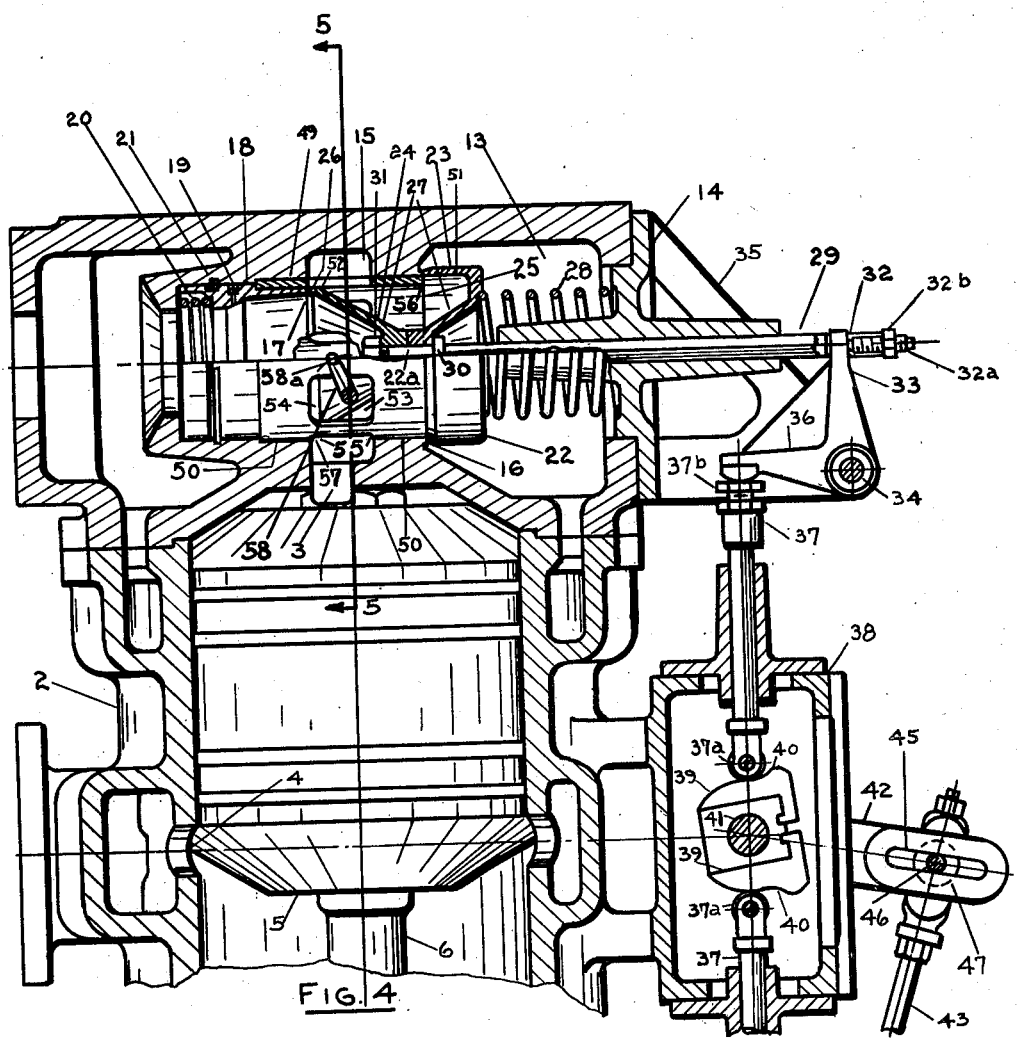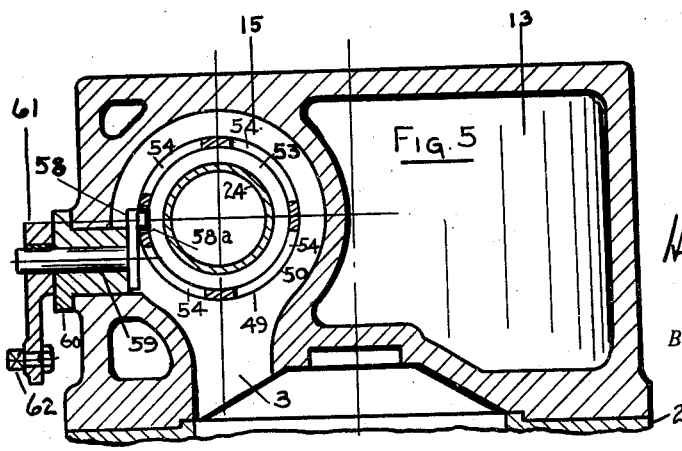

Herman G. Mueller
INVENTOR.

BY N. C. Lord
ATTORNEYS.

Patented Sept. 28, 1937

2,094,159

UNITED STATES PATENT OFFICE 2,094,159

VALVE MECHANISM FOR STEAM ENGINES

Herman G. Mueller, Erie, Pa., assignor to Skinner Engine Company, Erie, Pa., a corporation of Pennsylvania Application August 31, 1936, Serial No. 98,697

21 Claims. (Cl. 121—142)

This invention is designed to improve the valve mechanism as used in steam engines. The cut-off for steam engines using poppet valves is commonly accomplished by controlling the action of the reciprocating poppet valve. In the present invention this is accomplished by providing a telescopic control sleeve, into and out of which the poppet valve moves as it is actuated toward and from its seat. Thus the cut-off is accomplished by the telescopic action and tightness is accomplished by the seating of the valve. The cut-off controlling sleeve may be manually or automatically varied to vary the cut-off. Preferably the invention involves the use of such cut-off sleeve with a double beat valve and as exemplified is so shown.

The invention also contemplates a double beat valve sleeve passing steam through both ends of the valve. By so constructing the valve it is possible to reduce the diameter of the valve while maintaining the same passage capacity. The smaller valve reduces the clearance passages and thus adds to the economy of the engine and also reduces the size and expense of making the parts. Further features and details of the invention will appear from the specification and claims.

A preferred embodiment of the invention is illustrated in the accompanying drawings, as follows:

Fig. 1 shows a central section through the engine on the line 1—1 in Fig. 2.

Fig. 2 an elevation of the engine partly in section.

Fig. 3 a detached view of modified valve cam mechanism.

Fig. 4 an enlarged view of one of the valves illustrated in Figs. 1 and 2 in section on the line 1—1 in Fig. 2.

Fig. 5 a section on the line 5—5 in Figs. 1 and 4.

Figure 6:
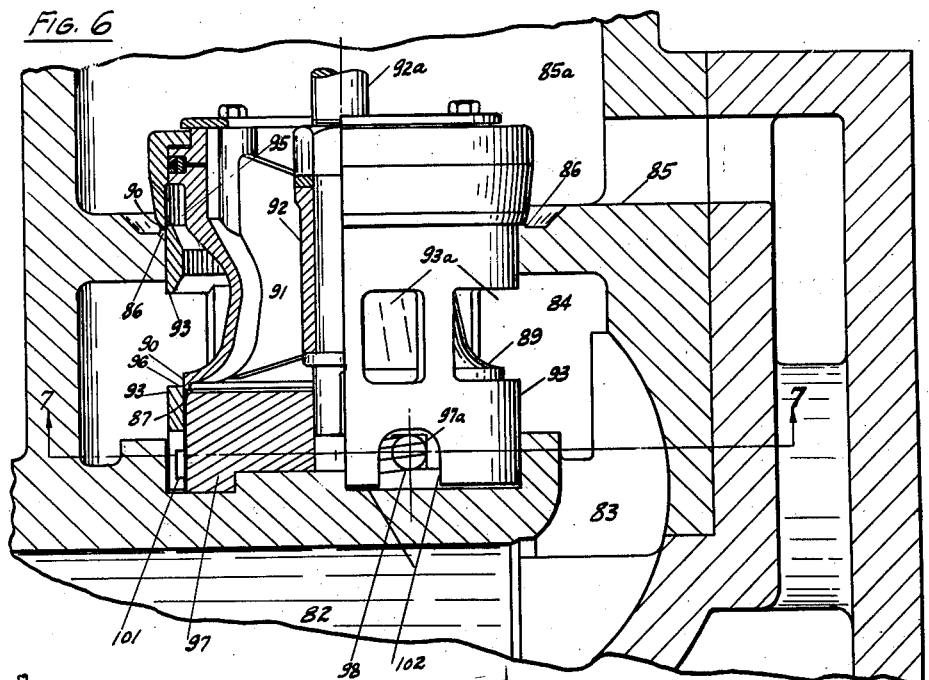
Fig. 6 shows a valve adapted to a horizontal cylinder, the valve being arranged vertically, and modified in construction.

1 marks an engine frame, 2 a cylinder, 3 inlet ports leading to the cylinder, 4 the centrally arranged exhaust ports for uniflow operation of the cylinder, 5 a piston operating in the cylinder, 6 a piston rod secured to the piston and extending through a gland 7, the piston rod being secured to a crosshead 8 suitably guided on the engine frame. A connecting rod 9 extends from the crosshead to a crank 10. The crank is carried by the crank shaft 11, the crank shaft being journaled in bearings 12 on the frame.

The valve mechanisms at both ends of the cylinder are substantially alike, each has a valve chest 13 which is provided with a cover 14. The chamber has an inner steam passage 15 leading to the port 3.

Valve seats 16 and 17 are provided, these being of comparatively common construction, and are arranged in accordance with prior practice. The seat 17 is carried by a yielding ring 18 sealed by a sealing ring 19, and yieldingly held in place by spring 20. A lock ring 21 holds the yielding seat ring 18 in place, having sufficient clearance to permit the yielding of the ring.

A valve 22 is made in two parts, 23 and 24. The part 23 has a seating edge 25 operating on the seat 16, and part 24 has a seating surface 26 operating on the seat 17. The two parts of the valve have the closed skirts 27 which extend from hub portions 22a through which the valve stem 29 extends. The valve stem has a shoulder 30 engaging the part 23 on the valve, and a nut 31 engages the part 24 to clamp the parts of the valve together. A spring 28 tends to hold the valve in closed position.

The valve stem 29 has a slotted head 32, and an operating lever 33 extends through this slot in position to lift the valve. The slotted stem head 32 carries an adjusting screw 32a with lock nut 32b. The lever 33 is pivoted on a pin 34 carried by bracket 35 extending from the cover 14. The lever 33 is connected to an arm 36 forming a bell crank, and the arm 36 is engaged by a push pin 37 with adjustable screw 37b and slidingly mounted in a cam box 38. The pin 37 terminates in a roller 37a or a mushroom 37c with the construction shown in Fig. 3. A cam 39 has actuating cam surfaces 40, one for each valve. The cam 39 is fixed on a shaft 41 which extends through the wall of the cam box 38, and a rock arm 42 is secured to the outer end of the shaft. The rock arm is connected by rod 43 with an eccentric 44. The eccentric 44 is mounted on the crank shaft 11, so that its angular relation to the crank is adjustable. Preferably the length of the rock arm 42 is also adjustable. This is accomplished by providing the rock arm 42 with a slot 45. A pin 46 connecting the rod 43 has a shoulder 47, the pin extending through the slot 45. A nut 48 on the end of the pin clamps the shoulder 47 in place on the arm and thus locks the pin 46 in the adjustment. Normally the lift and lead of the valve through this mechanism is constant, the adjustment being provided to give to the valve as high a lift as is practical for the particular purpose for which the engine is being used, and a suitable lead. Where the load is practically constant this may be a comparatively low lift. Where there is greater variation a higher lift with longer duration is utilized to give a wider range of cut-off.

A cut-off sleeve 49 is slidingly mounted in the valve case in a cylindrical opening 50. The valve end 23 has an interiorly arranged cylindrical surface 51 which is adapted to make a telescopic fit with the exterior on the sleeve 49. The outer surface of the valve portion 24 has a cylindrical surface 52 adapted to fit telescopically the inner surface of the sleeve 49. This sleeve forms a passage 53 around the valve leading from the seat 25 which forms a means of communication from the opening at the seat 16 with openings 54 through the sleeve leading to the chamber 15 and hence to the port 3.

Steam for passing the seat 17 comes in through the ring 18 and passes immediately to the passage 15. The openings 54 leave cylindrical portions 55 at the ends of the sleeve and these cylindrical ends have the cut-off edges 56 and 57 operating with relation to the seating edges 25 and 26 respectively of the valves. In operation the sleeve is moved to vary the cut-off.

As shown in Fig. 4 the sleeve effects no cut-off so that there is the maximum opening of the valve. As the sleeve is moved toward the right in that figure, the cut-off edges 56 and 57 are brought into position so that the cylindrical portions 51 and 52 pass into telescopic relation at an earlier point in the closing movement of the valve. By varying the position of the sleeve the point of cut-off may be controlled. After the cut-off is accomplished, the valve continues in its closing movement and finally completes the more certain closure on the seats 16 and 17. The cylindrical fit between the surfaces of the sleeve and the valve surfaces may be made as close as is practical—with ordinary working conditions. With the oscillating cam as indicated in Fig. 4 there is a slight variation in the lead as the sleeve is moved to change the cut-off but this variation is comparatively slight, as the lift takes place during the slow movement of the piston whereas the cut-off takes place during the more rapid movement of the piston. Consequently the slope of the lift diagram is much steeper on the lifting side than on the seating side. Where the rotating cam is used as in Figs. 3 and 8, the lifting side and seating side may be altered to suit any condition desired.

In order to adjust the sleeve a crank 58 is arranged to operate in an opening 58a in the wall of the sleeve. The sleeve rotates to accommodate the rocking movement of the crank, and the crank operates to move the sleeve axially to its desired adjustment. The crank is carried by crank shaft 59 journaled in a bearing 60 in the wall of the steam chest.

The shaft 59 of the upper valve is connected with a rock arm 61, and this rock arm is connected through a pin 62 with a rod 63 which is connected with a rock arm 65 on the crank shaft of the lower valve by means of a pin 64. The rock arm 65 is connected through a bearing 66 with a rod 67 which rod extends to a bell crank lever 68. The bell crank lever 68 is mounted on a pin 69, and this pin is mounted in the engine frame. The opposite end 70 of the bell crank extends into a groove 71 in a sleeve 72. The sleeve 72 is slidingly mounted on the crank shaft. It is provided with a second groove 73 which is adapted to receive the ends of the lever arms 74. The lever arms are pivotally mounted on pin 75 carried by head 76. The head 76 is fixed on the crank shaft. Governor weights 77 are rigidly secured to the lever arms 74 and their centrifugal action is balanced by spring 78 connecting these weights.

The operation of the mechanism may be followed from the above description. The double beat valve operating in the ordinary manner of double beat valves, from the cam mechanism driven from the crank shaft. The sleeve which telescopically operates with relation to the valve surfaces has the cut-off edges operating on the valves so that the cut-off is accomplished in accordance with adjustment of the sleeve. The governor through the linkage just described operates on the crank mechanism which moves the sleeve in accordance with the requirements of control so as to bring the cut-off edges together at an earlier or later part of the engine stroke, according to the requirements of the engine.

In the structure shown in Figs. 1 and 2 the cam 39 is of the rocker type and is made in this form preferably in order that the lift of the valve may be adjusted, but in very many cases this adjustment is not required and therefore a rotating cam may be used. This is shown in Fig. 3 where a rotary cam 39 is adapted to operate on the opposed push rods 37. This cam is mounted on a shaft 80 driven by a chain 81 from the crank shaft.

In Fig. 6 the valve is adapted to a vertical arrangement on a horizontal cylinder. In this, the cylinder 82 has an inlet port 83 leading from a valve chest 85. The valve chest is provided with valve seats 86 and 87 and with an annular chamber receiving steam passing by these seats and leading the steam to the port 83. The valve 89 is of the ordinary double-beat type having the seating surfaces 90 operating on the seats 86 and 87. The valve has the usual spider connection between the valve seating portions and the central hub 92. A stem 92a extends through this hub and is secured thereto, it being understood that this central portion of the valve passing webs 91 is hollow so as to afford passage of the steam. Steam is delivered through the valve past the bottom seat, and from the steam chest 85a past the upper seat. The cut-off sleeve 93 corresponds to the cut-off sleeve in Figs. 1 and 2 and has the cut-off edges 95 and 96 operating in conjunction with the upper and lower parts of the valve, the upper part having an interior cylindrical surface, and the lower part an outer cylindrical surface similar to that of Fig. 1 and Fig. 4 for operating telescopically with relation to the cut-off sleeve. The sleeve also has openings 93a leading to a passage 84, communicating with the port, 83.

Figure 7:
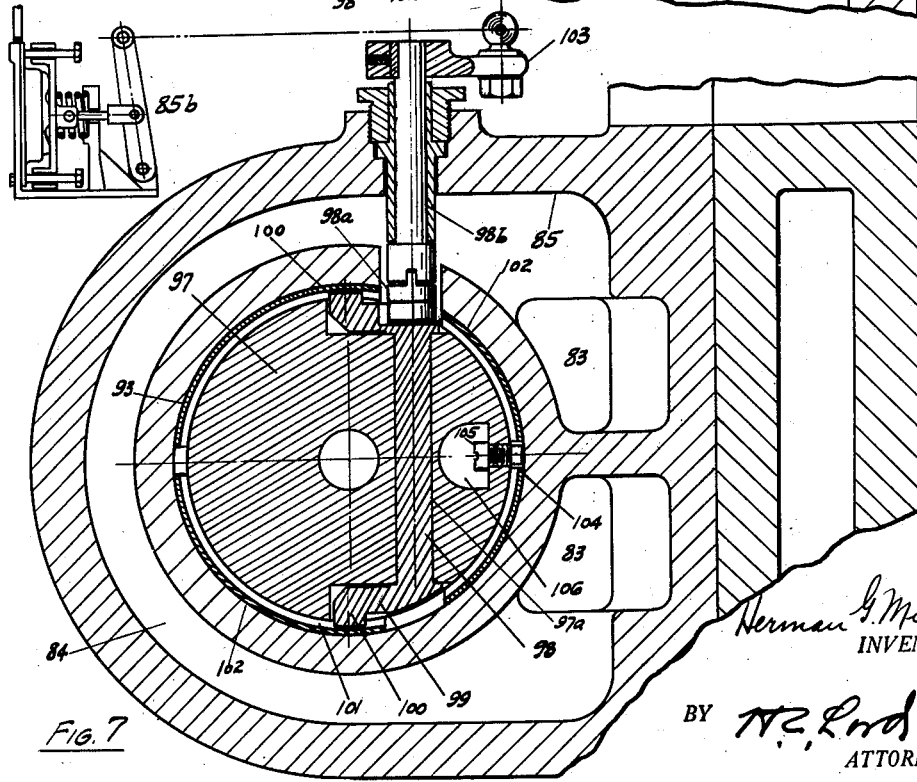
Fig. 7 shows a section on the line 7—7 in Fig. 6.

This sleeve, by reason of the fact that the steam to pass the lower seat must go through the valve, is quite large compared to its length. The single crank for operating the sleeve shown in Figs. 1, 2 and 4 would tend to cock the valve as its diameter is large compared with its length. To obviate this difficulty, the structure in Figs. 6 and 7 provides a crank at both sides of the sleeve. To accomplish this, a block 97 is inserted in the steam chest, this block providing the lower seat 87 and a bearing for the lower end of the sleeve. The block has an opening 97a extending through it in which a crank shaft 98 is journaled. A crank 99 extends from the shaft at each end, the cranks having crank pins 100 extending into an annular groove 101. This groove 101 is formed in the interior surfaces of the projections 102 at the bottom of the sleeve. The crank shaft is connected outwardly by means of a flexible coupling 98a and extension 98b through the steam chest wall and is provided with a rock arm 103 to which a controlling mechanism is attached in the same manner as to the rock arm 61. In order that the valve may be assembled from the end of the chest, the projections 102 permit the insertion of the sleeve which is then turned to pass by the crank pins. After the sleeve is in its lower position it is rotated to bring the pins into the groove 101. The sleeve is locked against rotation in this position by a screw 105 which extends in a vertical slot 104 in the sleeve. The block 97 is cut out at 106 to permit of operating the screw 105.

I have shown schematically a pressure regulator 85b which may be connected as indicated by the connecting lines with the operating lever 103 so as to afford a pressure control. The slight movement of the sleeve necessary for ordinary control is particularly adapted for automatic control in this way, since the sleeve is balanced for axial movement by equal opposed surfaces and steam pressures for all positions of both sleeve and valve in all constructions shown and, therefore, offers very little resistance to axial movement for either hand or automatic controls.

Figure 8:
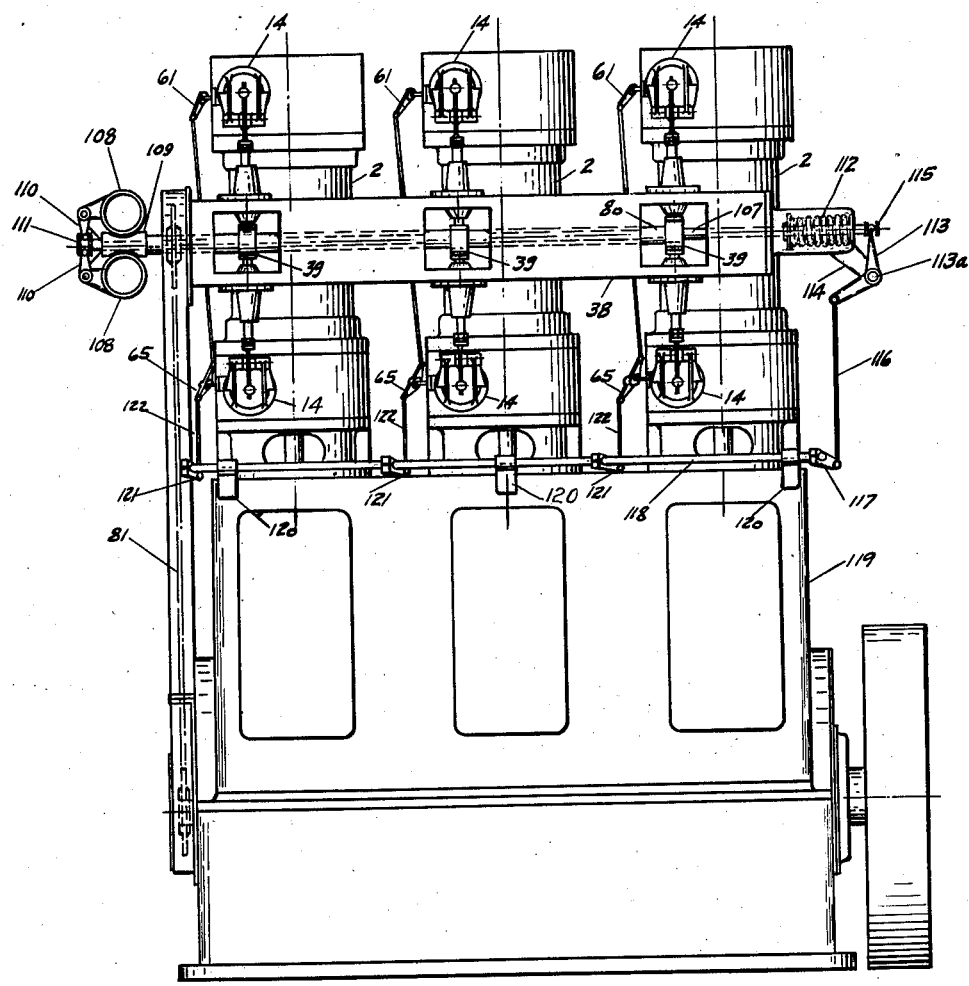
Fig. 8 shows the valve mechanism of Figs. 1 and 2 applied to a multi-cylinder engine, illustrating the manner of plural control from a single governor.

In Fig. 8 the manner of controlling the valve mechanism for a multiple cylinder engine is illustrated. The individual cylinders with the valve mechanisms are similar to those of Figs. 1 and 2. A rotating cam is utilized as illustrated in Fig. 3. The cam shaft 80 is hollow, and a controlling pin 107 extends through this shaft. A governor having weights 108 pivotally mounted on a head 109 secured on one end of the shaft 80. The weights have the lever arms 110 which operate in a spool 111 on the rod 107. A spring 112 operates against the opposite end of the rod 107 and balances the centrifugal force of the governor. A bell crank lever 113 is pivoted on a pin 113a, the pin being mounted on a bracket 114 extending from the end of the cam box. The lever 113 engages a spool 115 on the end of the rod 107. The lever 113 is connected by rod 116 with a rock arm 117. The rock arm is fixed on a rod 118 extending along the frame 119 of the engine. Bearings 120 are mounted on the frame to carry the rod 118. Rock arms 121, one for each cylinder, are fixed on the shaft 118, and rods 122 corresponding to rod 67 in Fig. 1 extend from the arms 121 to the rock arms 65 of the valve mechanism, and from this by a linkage and mechanism described with relation to Figs. 1 and 2 with the cut-off sleeves. Thus it will be seen by very simple governor mechanism a multiple cylinder engine may be formed with as many cylinders as desired and all controlled from the same governor.

The structure is particularly adapted as a reversing mechanism in that the telescopic cut-off permits the making of the two-way cams with a desirable slope for seating without sacrifice of economy.

While I have exemplified the invention as a valve mechanism as used in a steam engine, it will be understood that it is effective with any expansive fluid.

What I claim as new is:—

1. In a valve mechanism, the combination of a poppet valve; seats for said valve; closure surfaces operating telescopically on the valve; and means varying the relation of said surfaces for controlling the cut-off of the valve.

2. In a valve mechanism, the combination of a poppet valve; seats for said valve; closure surfaces operating telescopically on the valve; and speed responsive means varying the relation of said surfaces controlling the cut-off of the valve.

3. In a valve mechanism, the combination of a poppet valve having poppet seating surfaces and cylindrical closing surfaces; seats for said poppet surfaces; and a sleeve having telescopic relation with the cylindrical surfaces controlling the cut-off of the valve.

4. In a valve mechanism, the combination of a poppet valve having poppet seating surfaces and cylindrical closing surfaces; seats for said poppet surfaces; a sleeve having telescopic relation with the cylindrical surfaces controlling the cut-off of the valve; and means varying the relation of the valve and sleeve to vary the cut-off.

5. In a valve mechanism, the combination of a poppet valve having poppet seating surfaces and inwardly faced closing surfaces; seats for said poppet surfaces; and a sleeve having telescopic relation with the closing surfaces controlling the cut-off of the valve.

6. In a valve mechanism, the combination of a poppet valve having poppet seating surfaces and outwardly faced closing surfaces; seats for said poppet surfaces; and a sleeve having telescopic relation with the closing surfaces controlling the cut-off of the valve.

7. In a valve mechanism, the combination of a poppet valve having poppet seating surfaces and cylindrical closing surfaces; seats for said poppet surfaces; a sleeve having telescopic relation with the cylindrical surfaces controlling the cut-off of the valve; and a crank operating on the sleeve to vary the cut-off.

8. In a valve mechanism, the combination of a poppet valve having poppet seating surfaces and cylindrical closing surfaces; seats for said poppet surfaces; a sleeve having telescopic relation with the cylindrical surfaces controlling the cut-off of the valve; a crank operating on the sleeve to vary the cut-off; and a speed responsive means actuating the crank.

9. In a valve mechanism, the combination of a poppet valve; seats for said valve; closure surfaces operating telescopically on the valve; means varying the relation of said surfaces for controlling the cut-off of the valve; and means varying the lift of the valve.

10. In a valve mechanism, the combination of a poppet valve having poppet seating surfaces and cylindrical closing surfaces; seats for said poppet surfaces; a sleeve having telescopic relation with the cylindrical surfaces controlling the cut-off of the valve; and means varying the lift of the valve.

11. In a valve mechanism, the combination of a poppet valve having poppet seating surfaces and cylindrical closing surfaces; seats for said poppet surfaces; a sleeve having telescopic relation with the cylindrical surfaces controlling the cut-off of the valve; means varying the relation of the valve and sleeve to vary the cut-off; and means varying the lift of the valve.

12. In a valve mechanism, the combination of a double-beat poppet valve; seats for said valve; closure surfaces operating telescopically on said valve with relation to each seat; and means varying the relation of said surfaces to control the cut-off of the valve.

13. In a valve mechanism, the combination of a double-beat valve having poppet valve seating surfaces and cylindrical closing surfaces with relation to each seating surface; seats for said seating surfaces; and a sleeve having telescopic relation to the closing surfaces controlling the cut-off of the valve at each seat.

14. In a valve mechanism, the combination of a double-beat valve having poppet valve seating surfaces and cylindrical closing surfaces with relation to each seating surface; seats for said seating surfaces; a sleeve having telescopic relation to the closing surfaces controlling the cut-off of the valve at each seat; and means varying the relation of the valve and sleeve to vary the cut-off.

15. In a valve mechanism, the combination of a double-beat valve having poppet valve seating surfaces and cylindrical closing surfaces with relation to each seating surface, one of the cylindrical surfaces being outwardly faced and the other of the cylindrical surfaces being inwardly faced; seats for said seating surfaces; and a sleeve having telescopic relation to the closing surfaces controlling the cut-off of the valve at each seat.

16. In a valve mechanism, the combination of a double-beat valve having poppet valve seating surfaces and cylindrical closing surfaces with relation to each seating surface; seats for said seating surfaces; and a sleeve having telescopic relation to the closing surfaces, said sleeve having openings therethrough and closing edges with relation to said seating surface, one closing edge being at the end of the sleeve and the other closing edge being at the opening, said edges controlling the cut-off of the valve.

17. In a valve mechanism, the combination of a double-beat poppet valve; a chest for said valve having seats for the seating surfaces of said valve, said chest having communication outside of the valve with each end of the valve; closure surfaces operating telescopically on said valve with relation to each seat; and means varying the relation of said surfaces to the valve to control the cut-off of the valve.

18. In a valve mechanism, the combination of a poppet valve having poppet seating surfaces and cylindrical closing surfaces; seats for said poppet surfaces; a sleeve having telescopic relation with the cylindrical surfaces controlling the cut-off of the valve; cranks engaging opposite sides of said sleeve for varying the position of the sleeve relatively to the valve; and means actuating said cranks.

19. In a valve mechanism, the combination of a poppet valve having poppet seating surfaces and cylindrical closing surfaces; seats for said poppet surfaces; a sleeve having telescopic relation with the cylindrical surfaces controlling the cut-off of the valve, said sleeve having downwardly extending portions having transverse slots on the inner faces of said portions; cranks extending into the slots for actuating the sleeve; and means actuating the cranks.

20. In a valve mechanism, the combination of a plurality of valve mechanism units, each comprising a poppet valve; seat for said valve; closure surfaces operating telescopically on the valve; and means varying the relation of said surfaces for controlling the cut-off of the valve, said means comprising an actuating device common to all the units.

21. In a valve mechanism, the combination of a series of valve mechanism units, each comprising a poppet valve having poppet seating surfaces and cylindrical closing surfaces; seats for said poppet surfaces; a sleeve having telescopic relation with the cylindrical surfaces controlling the cut-off of the valve; and a cam mechanism comprising a cam shaft actuating the valves of the series, said shaft being hollow, a governor mounted on the cam shaft, a governor stem extending through the shaft, and means connecting the governor stem to the valves for controlling the cut-off.

HERMAN G. MUELLER.